United States Patent
Goto et al.

(10) Patent No.: US 8,994,823 B2
(45) Date of Patent: Mar. 31, 2015

(54) OBJECT DETECTION APPARATUS AND STORAGE MEDIUM STORING OBJECT DETECTION PROGRAM

(75) Inventors: Kunihiro Goto, Nagoya (JP); Shigeyoshi Hiratsuka, Aichi-gun (JP); Mitsuhiko Ota, Tsu (JP); Arata Takahashi, Nagoya (JP); Masayuki Usami, Nagoya (JP); Daisuke Konaka, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 927 days.

(21) Appl. No.: 13/176,445

(22) Filed: Jul. 5, 2011

(65) Prior Publication Data

US 2013/0010112 A1 Jan. 10, 2013

(51) Int. Cl.
  *H04N 7/18* (2006.01)
  *G06K 9/00* (2006.01)
(52) U.S. Cl.
  CPC .............. *H04N 7/18* (2013.01); *G06K 9/00805* (2013.01)
  USPC ..................................... 348/148; 348/E7.085
(58) Field of Classification Search
  CPC .............................. G06K 9/00805; H04N 7/18
  USPC ............................................ 348/148, E7.085
  See application file for complete search history.

(56) References Cited

U.S. PATENT DOCUMENTS

| | | | | |
|---|---|---|---|---|
| 5,059,796 A | * | 10/1991 | Nakamura | 250/330 |
| 2004/0030476 A1 | * | 2/2004 | Oswald et al. | 701/45 |
| 2007/0222566 A1 | * | 9/2007 | Tsuji et al. | 340/435 |
| 2010/0208075 A1 | * | 8/2010 | Katsuno | 348/148 |
| 2011/0140919 A1 | * | 6/2011 | Hara et al. | 340/907 |

FOREIGN PATENT DOCUMENTS

| | | |
|---|---|---|
| DE | 103 01 468 A1 | 10/2003 |
| DE | 102 57 842 A1 | 11/2003 |
| DE | 10 2007 014 012 A1 | 10/2007 |
| DE | 10 2007 037 610 A1 | 2/2009 |
| DE | 10 2007 052 093 A1 | 5/2009 |
| DE | 10 2010 001 954 A1 | 9/2010 |
| JP | 11-115660 | 4/1999 |
| JP | 2006-178652 | 7/2006 |
| JP | 2007-72665 | 3/2007 |
| JP | 2007-328630 | 12/2007 |
| JP | 2008-162364 | 7/2008 |
| JP | 2009-237897 | 10/2009 |

OTHER PUBLICATIONS

Office Action issued Apr. 25, 2012 in German Application No. 10 2011 078 615.5 (With English Translation).

* cited by examiner

*Primary Examiner* — Jay Patel
*Assistant Examiner* — Frank Huang
(74) *Attorney, Agent, or Firm* — Oblon, McClelland, Maier & Neustadt, L.L.P.

(57) ABSTRACT

In an object detection apparatus, a captured image of a scene around a host vehicle, information indicating a travel state of the host vehicle, and information indicating a surrounding situation around the host vehicle are obtained; risk areas in each of which an object is likely to exist, and area risk degrees of the risk areas are estimated based on the obtained information; posture risk degrees of respective postures are estimated based on a relation between each of the risk areas and the postures of the object assumed to exist in the risk area; a window image is extracted from a search range in the captured image, which corresponds to each of the risk areas, according to descending order of overall risk degrees; and it is identified whether the window image is an image showing the object, by comparing an identification model with the window image.

12 Claims, 5 Drawing Sheets

FIG. 3A
FIG. 3B
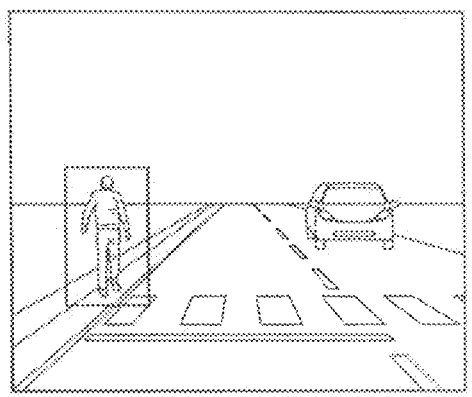
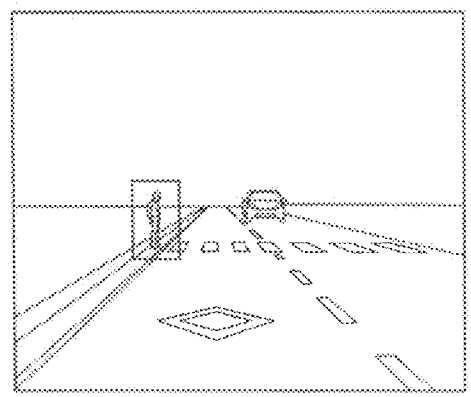
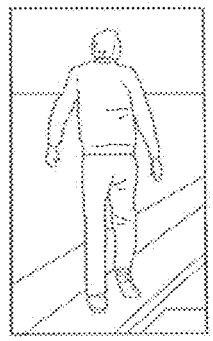
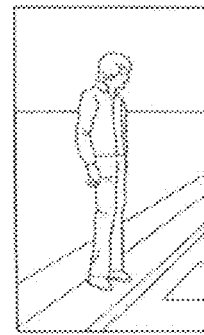

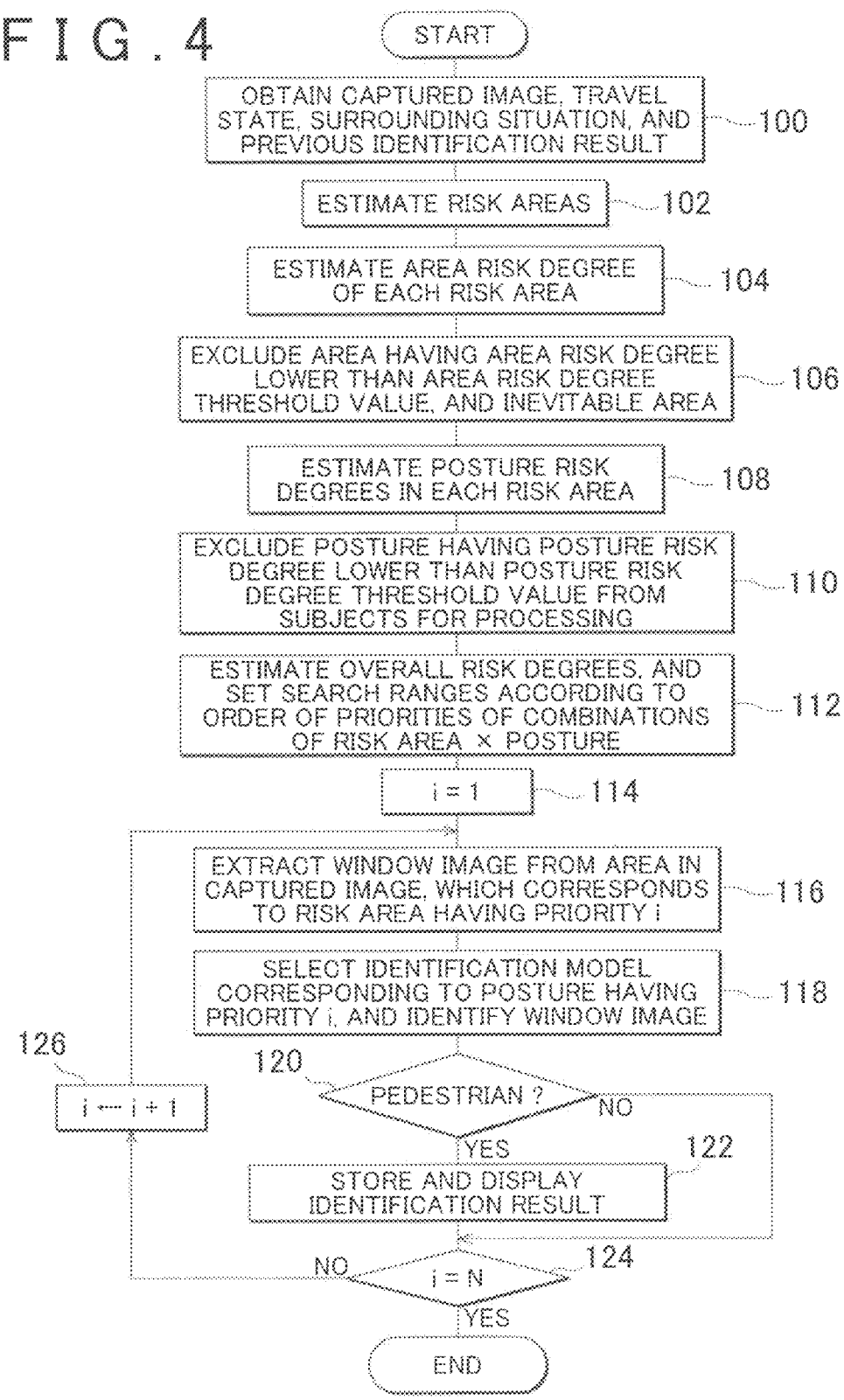

FIG.5

| RISK AREA (AREA RISK DEGREE) | POSTURE OF PEDESTRIAN ASSUMED TO EXIST IN RISK AREA (POSTURE RISK DEGREE) | OVERALL RISK DEGREE |
|---|---|---|
| AREA A (5) | FACING LEFTWARD (5) | 25 |
| | FACING RIGHTWARD (5) | 25 |
| | FACING REARWARD (1) EXCLUDED | – |
| | FACING FORWARD (1) EXCLUDED | – |
| AREA B (2) EXCLUDED | – | – |
| AREA C (4) | FACING LEFTWARD (1) EXCLUDED | – |
| | FACING RIGHTWARD (5) | 20 |
| | FACING REARWARD (3) | 12 |
| | FACING FORWARD (3) | 12 |
| ⋮ | ⋮ | ⋮ |
| AREA F (3) | FACING LEFTWARD (5) | 15 |
| | FACING RIGHTWARD (1) EXCLUDED | – |
| | FACING REARWARD (2) | 6 EXCLUDED |
| | FACING FORWARD (3) | 9 |
| AREA X INEVITABLE AREA/ EXCLUDED | – | – |

OBJECT DETECTION APPARATUS AND STORAGE MEDIUM STORING OBJECT DETECTION PROGRAM

BACKGROUND OF THE INVENTION

1. Field of the Invention

The invention relates to an object detection apparatus and a storage medium storing an object detection program, and more particularly, relates to an object detection apparatus that detects an object from a captured image and a storage medium storing an object detection program that detects an object from a captured image.

2. Description of Related Art

Recently, the number of vehicles provided with an object detection apparatus has been increasing. The object detection apparatus executes image processing on an image of a scene around the vehicle, which is captured by an in-vehicle camera, detects an object such as a pedestrian, and indicates the result of detection to a driver.

For example, an object determination apparatus has been proposed (refer to Japanese Patent Application Publication No. 2007-072665 (JP-A-2007-072665)). In the object determination apparatus, a plurality of templates in different modes are set for respective distances to objects to be determined; an object to be determined is detected from an image using the background differencing method or the saliency calculation method; a distance to the object is detected; a template corresponding to the distance is selected; and the object is determined by applying the template to the object that has been detected from the image as the object to be determined.

In a case where there are various postures of an object such as a pedestrian, it is possible to improve the accuracy of detecting the object by applying the templates in different modes, as in the object determination apparatus described in Japanese Patent Application Publication No. 2007-072665. However, as the number of the templates increases, the processing time is increased by applying all the templates to perform detection, although the detection accuracy can be increased by increasing the types of the templates.

Thus, an image recognition apparatus has been proposed (for example, refer to Japanese Patent Application Publication No. 2009-237897 (JP-A-2009-237897)). In the image recognition apparatus, a moving direction determination portion determines a moving direction of a target; a pedestrian pattern selection portion selects an image of a pedestrian moving in a moving posture and in the moving direction determined by the moving direction determination portion, from images of pedestrians moving in different moving directions, which are stored in advance in a pedestrian pattern storage portion. A recognition processing portion compares the pattern of the pedestrian moving in the selected moving direction, with the image pattern of the target to be recognized in an image captured by a camera, thereby recognizing a pedestrian.

Further, a candidate object area detection apparatus has been proposed (for example, refer to Japanese Patent Application Publication No. 2007-328630 (JP-A-2007-328630)). In the candidate object area detection apparatus, a plurality of different reference patterns for respective backgrounds of images (for example, reference patterns for sky, for a road, and for an area outside a road) are stored in a reference pattern database. A background area division portion divides the background of an input image using a vanishing point and traffic lane recognition. A reference pattern selection portion selects a reference pattern to be used by a candidate pedestrian area detection portion, according to a background area from which a determination area is cut out.

Also, a vehicle surrounding recognition system has been proposed (for example, refer to Japanese Patent Application Publication No. 2006-178652 (JP-A-2006-178652)). In the vehicle surrounding recognition system, an image processing portion retrieves a captured image for one frame from an image memory, and retrieves a vehicle speed v, a steering angle α, and an inclination angle β from a storage portion in synchronization with a frame rate. Further, the image processing portion obtains parameters for identifying a partial image by referring to LUT, based on the vehicle speed v, the steering angle α, and the inclination angle β, and stores the identified partial image in a frame memory. A pedestrian recognition processing portion retrieves the partial image stored in the frame memory, and determines the degree of similarity between the retrieved partial image and a standard pattern retrieved from a standard pattern portion.

In the image recognition apparatus described in Japanese Patent Application Publication No. 2009-237897, the pedestrian pattern to be used is selected based on the moving direction of the pedestrian. There is a problem that this technology cannot be applied when an object is static, for example, when a pedestrian is about to cross a road, and is static.

Also, in the candidate object area detection apparatus described in Japanese Patent Application Publication No. 2007-328630, the models for a road and for an area other than a road are selectively used. Attention is focused on variety of the background patterns, and attention is not focused on variety of postures of an object. Therefore, there is a problem that there is a possibility that robustness against a change in the posture may decrease. Also, because the risk degree of an area and the risk degree of the posture of an object are not taken into account, there is a problem that there is a possibility that the pedestrian model, the risk degree of which is not high for a driver, may be used, depending on the search range in which an object should be searched for.

Further, in the vehicle surrounding recognition system described in Japanese Patent Application Publication No. 2006-178652, the search range in which an object should be searched for is set based on the speed, steering angle, and the like of the host vehicle, and the risk degree, such as the possibility of collision, is not taken into account. There is a problem that there is a possibility that the pedestrian model, the risk degree of which is not high for a driver, may be used, depending on the search range in which an object should be searched for.

SUMMARY OF THE INVENTION

The invention provides an object detection apparatus that quickly and accurately detects an object having a high risk degree for a driver, and a storage medium storing an object detection program that quickly and accurately detects an object having a high risk degree for a driver.

An object detection apparatus according to a first aspect of the invention is configured to include: an obtaining portion that obtains a captured image of a scene around a host vehicle, information indicating a travel state of the host vehicle, and information indicating a surrounding situation around the host vehicle; a risk area estimation portion that estimates risk areas in each of which an object is likely to exist, and area risk degrees indicating risk degrees of the risk areas, based on the information obtained by the obtaining portion; a posture risk degree estimation portion that estimates posture risk degrees indicating risk degrees of respective postures, based on a relation between a positional relation between each of the risk areas and the host vehicle, and the postures of the object assumed to exist in the risk area; an extraction portion that estimates an overall risk degree of each of the postures of the object assumed to exist in each of the risk areas, based on the corresponding area risk degree and the corresponding posture risk degree, selects the risk areas according to descending order of the overall risk degrees, and extracts a window image from an area in the captured image, which corresponds to each of the selected risk areas; and an identification portion that identifies whether the window image is an image showing the object, based on the window image extracted by the extraction portion, and an identification model that is selected from identification models generated in advance for the respective postures of the object to identify the object, in accordance with the posture of the object assumed to exist in the corresponding selected risk area.

According to the first aspect of the invention, the obtaining portion obtains a captured image of a scene around a host vehicle, information indicating a travel state of the host vehicle, and information indicating a surrounding situation around the host vehicle; the risk area estimation portion estimates risk areas in each of which an object is likely to exist, and area risk degrees indicating risk degrees of the risk areas, based on the information obtained by the obtaining portion; and the posture risk degree estimation portion estimates posture risk degrees indicating risk degrees of respective postures, based on a relation between a positional relation between each of the risk areas and the host vehicle, and the postures of the object assumed to exist in the risk area. The extraction portion estimates an overall risk degree of each of the postures of the object assumed to exist in each of the risk areas, based on the corresponding area risk degree and the corresponding posture risk degree, selects the risk areas according to descending order of the overall risk degrees, and extracts a window image from an area in the captured image, which corresponds to each of the selected risk areas; and the identification portion identifies whether the window image is an image showing the object, based on the window image extracted by the extraction portion, and an identification model that is selected from identification models generated in advance for the respective postures of the object to identify the object, in accordance with the posture of the object assumed to exist in the corresponding selected risk area.

Thus, the search ranges are set according to descending order of the overall risk degrees based on the risk degrees of the respective areas, and the risk degrees of the respective postures of the object, and the appropriate identification model is selected from the identification models for the respective postures. Therefore, it is possible to quickly and accurately detect the object having a high risk degree for a driver.

Also, the risk area estimation portion may exclude the risk area having the area risk degree lower than a predetermined area risk degree threshold value, from subjects for processing. Also, the posture risk degree estimation portion may exclude the posture having the posture risk degree lower than a predetermined posture risk degree threshold value, from subjects for processing. Also, the extraction portion may exclude a combination of the risk area and the posture of the object, which has the overall risk degree lower than a predetermined risk degree threshold value, from subjects for processing. Also, the risk area estimation portion may exclude the risk area where if the object exists, the object inevitably collides with the host vehicle, from the risk areas. Thus, even when a calculation resource is limited, it is possible to preferentially detect the object having a high risk degree, that is, the object that needs to be detected.

Also, the risk area estimation portion may increase the area risk degree of the risk area corresponding to the window image that has been previously identified as the image showing the object by the identification portion. Also, the posture risk degree estimation portion may increase the posture risk degree of the posture of the object shown by the window image that has been previously identified as the image showing the object by the identification portion, among the postures of the object assumed to exist in the risk area corresponding to the window image that has been previously identified as the image showing the object by the identification portion. By feeding back the identification result in this manner, the accuracy of estimating the area risk degree and the posture risk degree is increased.

Also, the configuration may be such that, in a case where the object is a pedestrian, the postures of the object include at least one of an orientation of the pedestrian, an angle between legs, a relation between hands and legs, a static, walking, or running state, and a pedestrian's height.

Also, the configuration may be such that the information indicating the travel state of the vehicle includes at least one of a speed, a steering angle, and an attitude angle of the host vehicle.

Also, the configuration may be such that the information indicating the surrounding situation around the host vehicle includes at least one of a position of each surrounding object that exists in a surrounding area around the host vehicle, information indicating whether the surrounding object is moving or static, map information, and information regarding weather around the host vehicle.

Also, a storage medium storing an object detection program according to a second aspect of the invention causes a computer to function as: an obtaining portion that obtains a captured image of a scene around a host vehicle, information indicating a travel state of the host vehicle, and information indicating a surrounding situation around the host vehicle; a risk area estimation portion that estimates risk areas in each of which an object is likely to exist, and area risk degrees indicating risk degrees of the risk areas, based on the information obtained by the obtaining portion; a posture risk degree estimation portion that estimates posture risk degrees indicating risk degrees of respective postures, based on a relation between a positional relation between each of the risk areas and the host vehicle, and the postures of the object assumed to exist in the risk area; an extraction portion that estimates an overall risk degree of each of the postures of the object assumed to exist in each of the risk areas, based on the corresponding area risk degree and the corresponding posture risk degree, selects the risk areas according to descending order of the overall risk degrees, and extracts a window image from an area in the captured image, which corresponds to each of the selected risk areas; and an identification portion that identifies whether the window image is an image showing the object, based on the window image extracted by the extraction portion, and an identification model that is selected from identification models generated in advance for the respective postures of the object to identify the object, in accordance with the posture of the object assumed to exist in the corresponding selected risk area.

A storage medium that stores the program according to the second aspect is not particularly limited, and may be a hard disc or a ROM. Also, the storage medium may be a CD-ROM, a DVD disc, a magneto-optical disc, or an IC card. Further, the program may be downloaded from, for example, a server connected to a network.

As described above, according to the aspects, the search ranges are set according to the descending order of the overall risk degrees based on the risk degrees of the respective areas and the risk degrees of the respective postures, and the appropriate identification model is selected from the identification models for the respective postures. Therefore, it is possible to quickly and accurately detect the object having a high risk degree for a driver.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3A is a diagram used to explain a case where a posture risk degree is low, and FIG. 3B is a diagram used to explain a case where the posture risk degree is high;

FIG. 4 is a flowchart showing the content of an object detection processing routine in the object detection apparatus according to the embodiment; and FIG. 5 is a diagram showing an example of results of estimation regarding an area risk degree, the posture risk degree, and an overall risk degree.

DETAILED DESCRIPTION OF EMBODIMENTS

Hereinafter, an embodiment of the invention will be described in detail with reference to the drawings. In the embodiment, a case where the invention is applied to an object detection apparatus will be described. The object detection apparatus is provided in a vehicle, and detects a pedestrian as an object.

Figure 1:
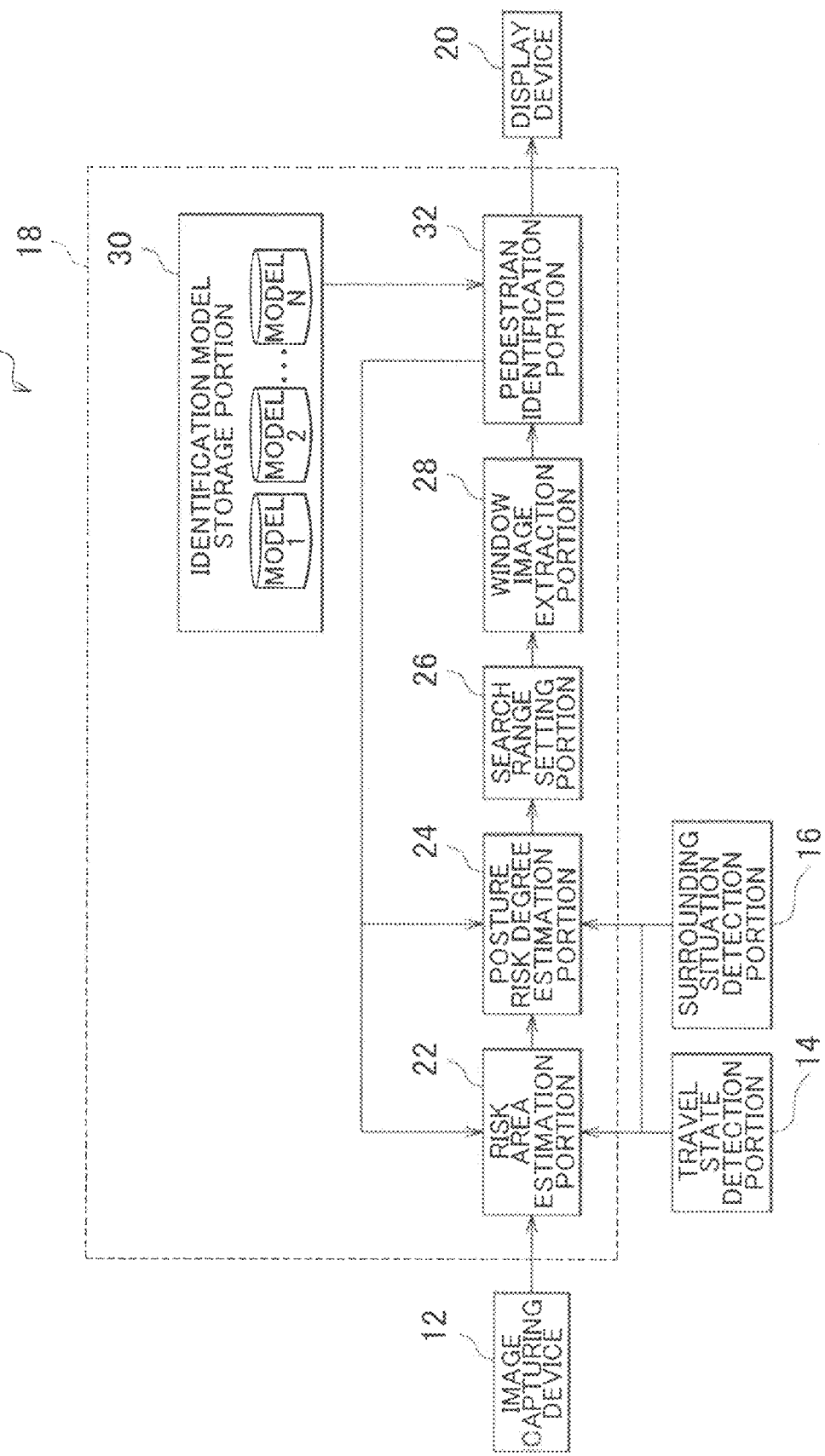
FIG. 1 is a block diagram showing the configuration of an object detection apparatus according to an embodiment.

As shown in FIG. 1, an object detection apparatus 10 according to the embodiment includes an image-capturing device 12 that captures an image of a range including an area to be identified; a travel state detection portion 14 that detects the travel state of a host vehicle; a surrounding situation detection portion 16 that detects a surrounding situation around the host vehicle; a computer 18 that executes an object detection processing routine that detects a pedestrian based on the captured image output from the image capturing device 12; and a display device 20 that displays the result of the processing executed by the computer 18.

The image capturing device 12 includes an image capturing portion (not shown) that captures the image of the range including the area to be identified, and generates an image signal; an A/D conversion portion (not shown) that converts the image signal, which is an analog signal generated by the image capturing portion, to a digital signal; and an image memory (not shown) that temporarily stores the image signal that has been subjected to the A/D conversion.

The travel state detection portion 14 is configured to include a vehicle speed sensor that detects the speed of the host vehicle; a steering angle sensor that detects a steering angle; and a gyro sensor that detects attitude angles of the host vehicle (a pitch angle, a yaw angle, and a roll angle). The detection values detected by the sensors are input to the computer 18.

The surrounding situation detection portion 16 is configured to include a laser radar that emits a laser beam toward an area ahead of the host vehicle while scanning, and detects the two-dimensional position of an object irradiated with the laser beam using the reflection of the laser beam; a GPS device that detects the position of the host vehicle based on satellite signals from GPS satellites; a map database that electronically retains map information including road configurations (for example, a line shape, a curvature, and an intersection), and road types (for example, an urban district, and an expressway); and a weather sensor configured to include a shine rain sensor, a temperature sensor, and a humidity sensor, and the like. The detection values detected by the devices and the sensors are input to the computer 18.

The computer 18 includes a CPU that controls the entire object detection apparatus 10; a ROM that is a storage medium storing a program of the object detection processing routine (described later), and the like; a RAM that serves as a work area and temporarily stores data; and a bus that connects them. In this configuration, the program for implementing the functions of constituent elements is stored in the storage medium such as the ROM or an HDD, and the CPU executes the program, and thus, the functions are implemented.

The computer 18 will be described with reference to functional blocks that represent respective function implementation phases determined based on hardware and software. As shown in FIG. 1, the configuration of the computer 18 can be represented as the configuration including a risk area estimation portion 22, a posture risk degree estimation portion 24, a search range setting portion 26, a window image extraction portion 28, an identification model storage portion 30, and a pedestrian identification portion 32. The risk area estimation portion 22 estimates risk areas and area risk degrees of the risk areas, based on the captured image, the travel state of the host vehicle, and the surrounding situation around the host vehicle. The posture risk degree estimation portion 24 estimates posture risk degrees of postures of a pedestrian that is assumed to exist in each risk area. The search range setting portion 26 sets search ranges, in which a pedestrian should be searched for, in the captured image, and assigns priorities to the search ranges based on overall risk degrees based on the area risk degrees and the posture risk degrees. The window image extraction portion 28 extracts a window image with a predetermined size from each of the areas in which the search ranges are set in the captured image, according to order of the priorities. The identification model storage portion 30 stores identification models for respective postures of a pedestrian. The pedestrian identification portion 32 identifies a pedestrian in the captured image, by comparing the window image extracted by the window image extraction portion 28 with the identification model for the posture.

Figure 2:
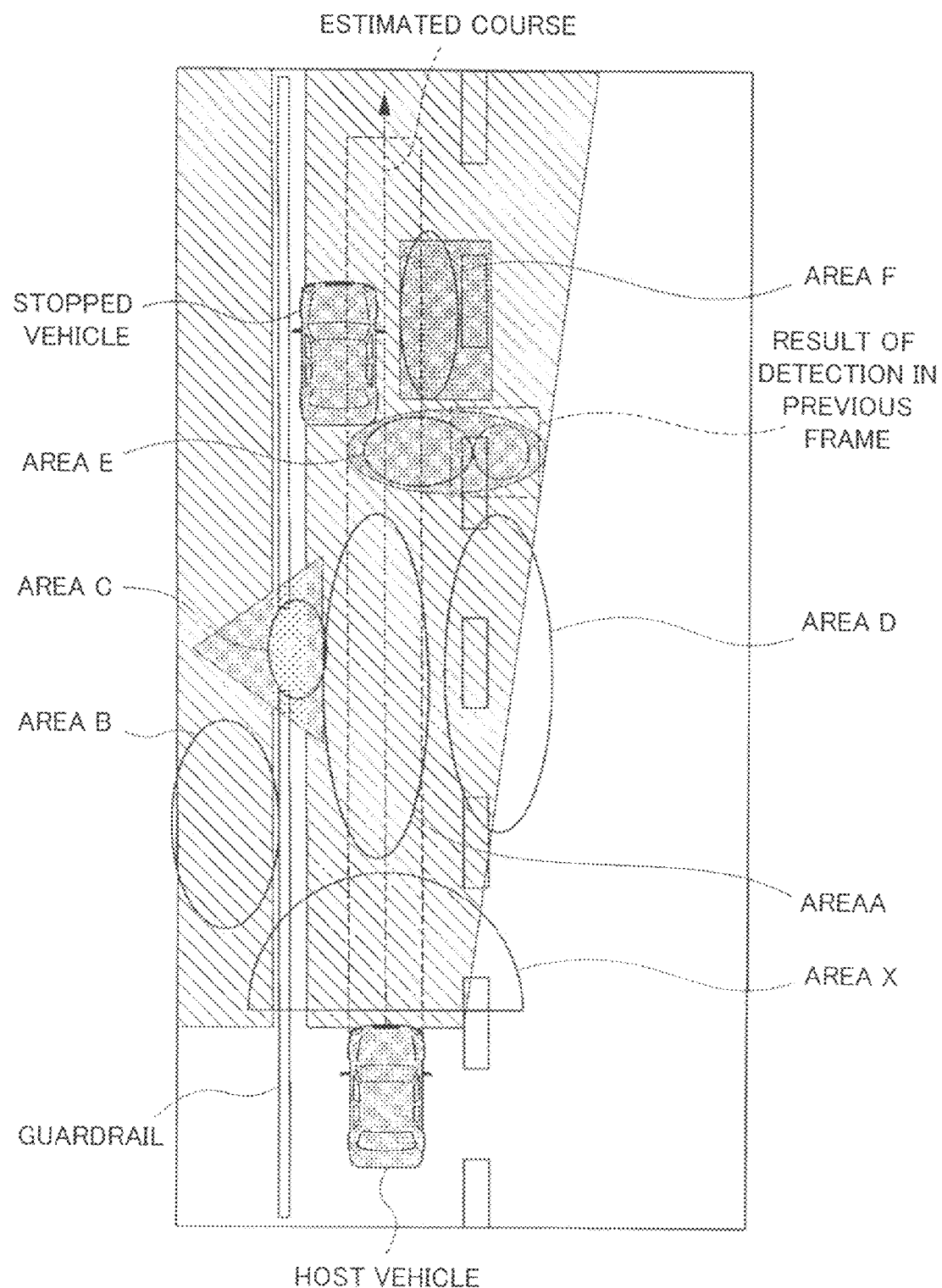
FIG. 2 is a diagram showing an example of a risk area map.

The risk area estimation portion 22 obtains the detection values detected by the travel state detection portion 14 and the surrounding situation detection portion 16, thereby detecting the positions of objects that exist around the host vehicle, as shown in FIG. 2. The risk area estimation portion 22 also determines the types of the objects (a preceding vehicle, an oncoming vehicle, a building, a stopped vehicle, a guardrail, a curb, a street tree, a telephone pole, a traffic lane, a pedestrian crossing, and the like), and determines whether each object is a moving object or a static object, taking into account the recognition result obtained by executing image recognition processing on the captured image. On the basis of the information, the risk area estimation portion 22 estimates risk areas in each of which a pedestrian is likely to exist. Further, the risk area estimation portion 22 estimates the probability of existence of a pedestrian in each risk area, and the area risk degree of each risk area, which indicates the possibility that a pedestrian will collide with the host vehicle after several seconds on the assumption that the pedestrian exists in the risk area. More specifically, the risk area estimation portion 22 estimates the area risk degree of each risk area, based on information such as the positional relation between the risk area and the position of the host vehicle after a predetermined time, which is estimated based on the distance between the host vehicle and the risk area, the position of the risk area, the speed of the host vehicle, the steering angle, the road configuration, and the like, information regarding whether each of objects near the risk area is moving or static, and whether each of objects constituting the risk area is moving or static, and information regarding whether the risk area is an urban district or an expressway.

For example, in a case where areas A to F are estimated to be risk areas as shown in FIG. 2, in areas ahead of the host vehicle, the closer the area is to the host vehicle, the higher the possibility of collision in the area is, if an object exits in the area. Thus, the area risk degree of the area close to the host vehicle is increased. Particularly, the area A is in the traffic lane in a vehicle traveling direction in which the host vehicle travels, and therefore, the area risk degree of the area A is increased. The area B is a sidewalk close to the host vehicle. However, because there is a guardrail between the host vehicle and the area B, the possibility of collision is low even if a pedestrian exists in the area B. Therefore, the area risk degree of the area B is decreased. However, in an area where there is a gap between guardrails, such as the area C, there is a high possibility that a pedestrian may walk through the gap between the guardrails, and cross the road. Therefore, the area risk degree of the area C is increased. Because the area F is near a stopped vehicle, there is a high probability that a pedestrian may suddenly appear from a blind spot behind the stopped vehicle, or a pedestrian may get on or off the stopped vehicle. Therefore, the area risk degree of the area F is increased. Also, obviously, there is a high probability that a pedestrian may exist in an area near a position at which a pedestrian has been detected through detection processing executed on a previous frame, and therefore, the area risk degree of the area is increased. For example, in a case where a pedestrian facing leftward has been detected in an area defined by broken lines in FIG. 2 in a previous frame, there is a high probability that the pedestrian may exist in the area E in a current frame. Therefore, the area risk degree of the area E is increased.

If the area risk degree of an area is lower than a predetermined area risk degree threshold value, the risk area estimation portion 22 excludes the area from the risk areas. Also, the risk area estimation portion 22 excludes, from the risk areas, the area where if a pedestrian exists, the pedestrian inevitably collides with the host vehicle. There is the area which is extremely close to the host vehicle, and in which if a pedestrian exists, the pedestrian inevitably collides with the host vehicle, such as an area X in FIG. 2. For example, in a case where a pedestrian has been detected based on a result of detection previously performed by the apparatus according to the embodiment, and a warning has been provided to a driver, the host vehicle is supposed to have already avoided the pedestrian, and is supposed to have moved in such a direction that the pedestrian does not enter the inevitable area. Also, the possibility that a pedestrian may suddenly appear in the inevitable area is extremely low. If a pedestrian exists in the inevitable area, the risk is significantly high. However, because the probability that a pedestrian may exist in the inevitable area is extremely low, the inevitable area is excluded from the search ranges in which a pedestrian should be searched for.

The posture risk degree estimation portion 24 estimates the posture risk degrees in each risk area, based on the relation between the positional relation between the risk area and the host vehicle, and postures of a pedestrian assumed to exist in the risk area. For example, as shown in FIG. 3A, when a pedestrian in a sidewalk on the left side of the host vehicle faces forward (i.e., a pedestrian's back faces toward the host vehicle), it is indicated that the pedestrian moves in parallel with the road, and therefore, the risk of collision between the pedestrian and the host vehicle is low. On the other hand, even when a pedestrian exists in the sidewalk on the left side of the host vehicle, if the pedestrian faces rightward as shown in FIG. 3B, there is a high possibility that the pedestrian is about to cross the road ahead of the host vehicle, and therefore, the risk of collision between the pedestrian and the host vehicle is high. Thus, the posture risk degree is set to vary depending on the relation between the positional relation between the host vehicle and the risk area, and the posture of a pedestrian. In the embodiment, the phrase "a pedestrian faces leftward" signifies that a pedestrian faces leftward with respect to the vehicle traveling direction when a driver sees the pedestrian, the phrase "a pedestrian faces rightward" signifies that a pedestrian faces rightward with respect to the vehicle traveling direction when a driver sees the pedestrian, the phrase "a pedestrian faces rearward" signifies that a pedestrian faces in a direction opposite to the vehicle traveling direction when a driver sees the pedestrian, and the phrase "a pedestrian faces forward" signifies that a pedestrian faces in the vehicle traveling direction when a driver sees the pedestrian.

For example, because the area A shown in FIG. 2 is in the road ahead of the host vehicle, if a pedestrian exists in the area A, there is a risk regardless of the posture of the pedestrian. However, the possibility that a pedestrian facing forward or rearward may exist in this area A is low, and there is a high probability that a pedestrian crossing this area may exist, that is, a pedestrian facing rightward or leftward may exist in this area. Further, if a pedestrian crossing this area exists, there is a high possibility of collision between the pedestrian and the host vehicle, and therefore, the posture risk degree of the posture of facing rightward or leftward in the area A is increased. Because the area C is on the left side of the host vehicle, if there is a pedestrian that will cross the area C toward the right side, the risk is high, and therefore, the posture risk degree of the posture of facing rightward in the area C is increased. In contrast, because the area D is on the right side of the host vehicle, the posture risk degree of the posture of facing leftward in the area D is increased. In a case where a pedestrian has been detected through the detection processing executed on the previous frame, there is a high possibility that the pedestrian in the posture detected in the previous frame may exist. Therefore, the posture risk degree of the posture of the pedestrian detected in the previous frame is increased. For example, in a case where a pedestrian facing leftward has been detected in the area defined by broken lines in FIG. 2 in the previous frame, there is a high probability that the pedestrian facing leftward may exist in the area E in the current frame. Therefore, the posture risk degree of the posture of facing leftward in the area E is increased.

Also, the posture risk degree estimation portion 24 excludes the posture having the posture risk degree lower than a predetermined posture risk degree threshold value, from subjects for processing.

The search range setting portion 26 estimates the overall risk degree of each posture in each risk area, by multiplying the area risk degree estimated by the risk area estimation portion 22 by the posture risk degree estimated by the posture risk degree estimation portion 24. For example, each of the area risk degree and the posture risk degree may be indicated by any one of five degrees (1 to 5) in a manner such that a higher number indicates a higher risk degree. In this case, if the area risk degree of the area C is 4, and the posture risk degree of the posture of facing rightward in the area C is 5, the overall risk degree is 20. The search range setting portion 26 sets search ranges to areas in the captured image, which correspond to the risk areas, while setting priorities according to descending order of the overall risk degrees. The overall risk degrees of postures of a pedestrian in the same risk area may be different from each other. Therefore, after an area is set as the search area once, the same area may be set as the search range again, based on a different posture.

Also, the search range setting portion 26 excludes the case having the overall risk degree lower than a predetermined risk degree threshold value (i.e., the combination of the risk area and the posture of the object, which has the overall risk degree lower than the predetermined risk degree threshold value), from the subjects for the processing.

The window image extraction portion 28 cuts out an image from the area set as the search range in the captured image according to the priority, while moving a window with a predetermined size (referred to as "search window") by a predetermined moving amount per one step (referred to as "search step"). The window that has been cut out is referred to as "window image".

The identification model storage portion 30 stores identification models that are generated in advance through learning. When the pedestrian identification portion 32 identifies a pedestrian, the pedestrian identification portion 32 refers to the identification models. The identification models are generated for respective postures of a pedestrian (the posture of facing leftward, the posture of facing rightward, the posture of facing rearward, and the posture of facing forward in this case), and are stored.

The pedestrian identification portion 32 retrieves, from the identification model storage portion 30, the identification model corresponding to the posture of a pedestrian in the search range selected according to the priority. The pedestrian identification portion 32 compares the identification model that has been retrieved, with the extracted window image, thereby identifying whether the window image is an image showing a pedestrian. It is possible to employ known methods as the identification method. For example, it is possible to employ the template matching, and the support vector machine (SVM). Also, the pedestrian identification portion 32 controls the display device 20 to display the identification result in a manner such that the identification result is superimposed on the captured image. In addition, the pedestrian identification portion 32 stores the identification result in a predetermined storage region so that the identification result is used in processing on a next frame. The stored identification result is fed back to the risk area estimation portion 22 and the posture risk degree estimation portion 24.

Next, the object detection processing routine executed by the computer 18 of the object detection apparatus 10 according to the embodiment will be described with reference to FIG. 4.

In step 100, the captured image captured by the image capturing device 12, and the detection values detected by the travel state detection portion 14 and the surrounding situation detection portion 16 are obtained. Also, the identification result regarding the previous frame, which has been stored in the predetermined region, is obtained.

Then, in step 102, the positions of surrounding objects that exist around the host vehicle are detected based on the captured image, the detection values, and the identification result regarding the previous frame, which have been obtained in step 100. In addition, the types of the objects are determined taking into account the recognition result obtained through the image recognition processing executed on the captured image. On the basis of the information, the risk areas, in each of which a pedestrian is likely to exist, are estimated. Thus, for example, a risk area map as shown in FIG. 2 is generated.

Then, in step 104, the area risk degree of each risk area is estimated based on information such as the positional relation between the risk area and the position of the host vehicle after a predetermined time, which is estimated based on the distance between the host vehicle and the risk area, the position of the risk area, the speed of the host vehicle, the steering angle, the road configuration, and the like, information regarding whether each of objects near the risk area is moving or static, and whether each of objects constituting the risk area is moving or static, and information regarding whether the area is an urban district or an expressway. For example, in a case where the risk area map as shown in FIG. 2 is generated, and the area risk degree is indicated by any one of five degrees (1 to 5) in a manner such that a higher number indicates a higher risk degree, the area risk degree of the area A may be estimated to be "5", the area risk degree of the area B may be estimated to be "2", the area risk degree of the area C may be estimated to be "4", and the area risk degree of the area F may be estimated to be "3", as shown in FIG. 5.

Then, in step 106, if the area risk degree of an area estimated in step 104 is lower than the predetermined area risk degree threshold value, the area is excluded from the risk areas. For example, in the example shown in FIG. 5, in a case where the area risk degree threshold value is "3", the area B whose area risk degree is "2" is excluded from the risk areas. Also, the inevitable area, where if a pedestrian exists, the pedestrian inevitably collides with the host vehicle, is also excluded from the risk areas.

Then, in step 108, the posture risk degrees in each risk area are estimated based on the relation between the positional relation between the risk area and the host vehicle, and the postures of a pedestrian assumed to exist in the risk area. For example, in the example shown in FIG. 2, in a case where the posture risk degree is indicated by any one of five degrees (1 to 5) in a manner such that a higher number indicates a higher risk degree, the posture risk degree of the posture of facing leftward in the area A may be estimated to be "5", the posture risk degree of the posture of facing rightward in the area A may be estimated to be "5", the posture risk degree of the posture of facing rearward may be estimated to be "1", and the posture risk degree of the posture of facing forward may be estimated to be "1", as shown in FIG. 5. The posture risk degree of each posture in each of other risk areas is also estimated based on the relation between the posture and the risk area. Because the area B and the area X have already been excluded from the risk areas, the process in this step is not executed for the area B and the area X.

Then, in step 110, if the posture risk degree of a posture estimated in step 108 is lower than the predetermined posture risk degree threshold value, the posture is excluded from the subjects for the processing. For example, in the example shown in FIG. 5, in a case where the posture risk degree threshold value is "2", the posture of facing rearward and the posture of facing forward in the area A are excluded from the subjects for the processing, because the posture risk degree of the posture of facing rearward in the area A and the posture risk degree of the posture of facing forward in the area A are "1".

Then, in step 112, the overall risk degree of each posture in each risk area is estimated by multiplying the area risk degree estimated in step 104 by the posture risk degree estimated in step 108. The process in this step is not executed for the area(s) that has (have) already been excluded from the risk areas, and the posture(s) that has (have) already been excluded from the subjects for the processing. The case having the overall risk degree lower than the predetermined risk degree threshold value (the combination of the risk area and the posture of the object, which has the overall risk degree lower than the predetermined risk degree threshold value) is excluded. The search areas are set to areas in the captured image, which correspond to the respective risk areas, in a manner such that the priority becomes higher as the overall risk degree becomes higher. Hereinafter, each posture in each risk area is represented in the form of "the combination of the risk area×the posture (for example, the combination of the area A×the posture of facing leftward)".

In the example shown in FIG. 5, for example, the overall risk degree of the combination of the area A×the posture of facing leftward is 25 (the area risk degree "5" of the area A×the posture risk degree "5" of the posture of facing leftward in the area A=25). In a case where the risk degree threshold value is "8", the combination of the area F×the posture of facing rearward, which has the overall risk degree of "6", is excluded from the subjects for the processing. Priorities i (i=1 to N:N is the total number of the combinations of the risk area×posture, which are the subjects for the processing) are assigned to the other combinations of the risk area×the posture according to descending order of the overall risk degrees. For example, a condition that if the combinations have the same overall risk degree, a higher priority is assigned to the combination having a higher area risk degree, or a condition that if the combinations have the same overall risk degree, a higher priority is assigned to the combination having a higher posture risk degree is set in advance. Thus, the priorities are set according to the condition. In this example, a first priority 1 is assigned to the combination of the area A×the posture of facing leftward, a second priority 2 is assigned to the combination of the area A×the posture of facing rightward, a third priority 3 is assigned to the combination of the area C×the posture of rightward, a fourth priority 4 is assigned to the combination of the area F×the posture of facing leftward, and a fifth priority 5 is assigned to the combination of the area C×the posture of facing rearward.

Then, in step 114, the variable i indicating the priority i is set to 1. Then, in step 116, the combination of the risk area× the posture, which has the priority i, is selected. Then, the window image is extracted from the search range in the captured image, which corresponds to the risk area in the selected combination of the risk area×the posture, which has the priority i. The search range in the captured image, which corresponds to the risk area, is a range set in the captured image to correspond to the risk area based on the estimated size and position of the risk area, or a range obtained by adding a margin to the range set based on the estimated size and position of the risk area. While the search range is scanned using the search window, the window image is extracted.

Then, in step 118, the identification model corresponding to the posture in the selected combination of the risk area×the posture, which has the priority i, is retrieved from the identification model storage portion 30, and the retrieved identification model is compared with the window image extracted in step 116 to identify whether the window image is an image showing a pedestrian. For example, the identification model for the posture of facing leftward is used for the combination of the area A×the posture of facing leftward.

Then, in step 120, it is determined whether the window image has been identified as an image showing a pedestrian as a result of the identification process executed in step 118. If the window image shows a pedestrian, the routine proceeds to step 122, and if the window image does not show a pedestrian, the routine skips step 122, and proceeds to step 124.

In step 122, the position and size of the window image, and the posture of the used identification model are stored, as the identification result, in the predetermined storage region. The identification result is obtained as the identification result regarding the previous frame, in step 100 in the processing on the next frame. Further, on the basis of the identification result, the display device 20 is controlled to display the detected pedestrian in a manner such that the pedestrian is surrounded by a window in the captured image. At this time, for example, an arrow showing the orientation of the pedestrian may be also displayed.

In step 124, it is determined whether the processing has been executed on the search ranges set based on all the combinations of the risk area×the posture, by determining whether the variable i has become N. If the variable i is not N (i≠N), the routine proceeds to step 126. In step 126, the variable i is incremented by 1. Then, the routine returns to step 116, and the processing is repeated. If the variable i has become N (i=N), the processing is ended.

As described above, in the object detection apparatus according to the embodiment, the search ranges are set according to descending order of the overall risk degrees based on the area risk degrees and the posture risk degrees, and the appropriate identification model is selected from the identification models for the respective postures. Therefore, it is possible to quickly and accurately detect a pedestrian having a high risk degree for a driver.

Also, the risk area having the area risk degree lower than the corresponding predetermined threshold value, the posture having the posture risk degree lower than the corresponding predetermined threshold value, the combination of the risk area and the posture, which has the overall risk degree lower than the corresponding predetermined threshold value, and the inevitable area are excluded from the subjects for the processing. Therefore, even when a calculation resource is limited, it is possible to reduce calculation cost, and to quickly and accurately detect a pedestrian having a high priority, that is, a pedestrian who needs to be detected.

Further, in the embodiment, the case where the object to be detected is a pedestrian has been described. However, the object to be detected may be, for example, a bicycle. In the case where the object is a bicycle, the postures may include, for example, the orientation of a bicycle, a static state of a bicycle, and a moving state of a bicycle.

Further, in the embodiment, the case where each subject having the risk degree lower than the corresponding threshold value is excluded from the subjects for the processing has been described. However, in a case where there is a sufficient calculation resource, all the estimated combinations of the risk area×posture may be subjected to the processing, without performing exclusion. Also, only the exclusion based on the area risk degree may be performed, only the exclusion based on the posture risk degree may be performed, or only the exclusion based on the overall risk degree may be performed.

Further, in the embodiment, the case where the postures of a pedestrian include the posture of facing leftward, the posture of facing rightward, the posture of facing rearward, and the posture of facing forward has been described. However, orientations classified into more categories may be employed. The postures may be classified based on the angle between legs, the relation between hands and legs, whether a pedestrian is in a static, walking, or running state, and whether a pedestrian is an adult or a child (i.e., based on a pedestrian's height). The extent of movement of a pedestrian can be determined based on the angle between legs, and the relation between hands and legs. Therefore, when the angle between legs is large, the posture risk degree may be increased. When a pedestrian is walking, the posture risk degree may be set to a higher degree than when a pedestrian is static. When a pedestrian is running, the posture risk degree may be set to a higher degree than when a pedestrian is walking. Also, because a child is usually less careful for a vehicle than an adult, when a pedestrian is a child (i.e., a pedestrian's height is small), the posture risk degree may be increased.

In the embodiment, the case where the overall risk degree is estimated by multiplying the area risk degree by the posture risk degree has been described. However, the overall risk degree may be estimated as the sum of the area risk degree and the posture risk degree, or the average of the area risk degree and the posture risk degree. The overall risk degree may be estimated by weighting the area risk degree and the posture risk degree, and calculating the sum, product, or average of the weighted area risk degree and the weighted posture risk degree.

What is claimed is:

1. An object detection apparatus comprising:
   an obtaining portion that obtains a captured image of a scene around a host vehicle, information indicating a travel state of the host vehicle, and information indicating a surrounding situation around the host vehicle;
   a risk area estimation portion that estimates risk areas in each of which an object is likely to exist, and area risk degrees indicating risk degrees of the risk areas, based on the information obtained by the obtaining portion;
   a posture risk degree estimation portion that estimates posture risk degrees indicating risk degrees of respective postures, based on a relation between a positional relation between each of the risk areas and the host vehicle, and the postures of the object assumed to exist in the risk area;
   an extraction portion that estimates an overall risk degree of each of the postures of the object assumed to exist in each of the risk areas, based on the corresponding area risk degree and the corresponding posture risk degree, selects the risk areas according to descending order of the overall risk degrees, and extracts windows from areas in the captured image, the areas respectively corresponding to the selected risk areas; and
   an identification portion that identifies whether each of the window images extracted by the extraction portion is an image showing the object, based on an identification model and the each of the window images, the identification model being selected from identification models generated in advance for the respective postures of the object to identify the object, in accordance with the posture of the object assumed to exist in the corresponding selected risk area,
   wherein each time when one of the risk areas is selected by the extraction portion, the extraction portion extracts the window image from the corresponding one of the areas in the captured image and the identification portion identifies whether the extracted window image is the image showing the object.

2. The object detection apparatus according to claim 1, wherein
   the risk area estimation portion excludes the risk area having the area risk degree lower than a predetermined area risk degree threshold value, from subjects for processing.

3. The object detection apparatus according to claim 1, wherein
   the posture risk degree estimation portion excludes the posture having the posture risk degree lower than a predetermined posture risk degree threshold value, from subjects for processing.

4. The object detection apparatus according to claim 1, wherein
   the extraction portion excludes a combination of the risk area and the posture of the object, which has the overall risk degree lower than a predetermined risk degree threshold value, from subjects for processing.

5. The object detection apparatus according to claim 1, wherein
   the risk area estimation portion excludes the risk area where if the object exists, the object inevitably collides with the host vehicle, from the risk areas.

6. The object detection apparatus according to claim 1, wherein
   the risk area estimation portion increases the area risk degree of the risk area corresponding to the window image that has been previously identified as the image showing the object by the identification portion.

7. The object detection apparatus according to claim 1, wherein
   the posture risk degree estimation portion increases the posture risk degree of the posture of the object shown by the window image that has been previously identified as the image showing the object by the identification portion, among the postures of the object assumed to exist in the risk area corresponding to the window image that has been previously identified as the image showing the object by the identification portion.

8. The object detection apparatus according to claim 1, wherein
   in a case where the object is a pedestrian, the postures of the object include at least one of an orientation of the pedestrian, an angle between legs, a relation between hands and legs, a static, walking, or running state, and a pedestrian's height.

9. The object detection apparatus according to claim 1, wherein
   the information indicating the travel state of the vehicle includes at least one of a speed, a steering angle, and an attitude angle of the host vehicle.

10. The object detection apparatus according to claim 1, wherein
    the information indicating the surrounding situation around the host vehicle includes at least one of a position of each surrounding object that exists in a surrounding area around the host vehicle, information indicating whether the surrounding object is moving or static, map information, and information regarding weather around the host vehicle.

11. A non-transitory storage medium storing an object detection program that causes a computer to function as:
    an obtaining portion that obtains a captured image of a scene around a host vehicle, information indicating a travel state of the host vehicle, and information indicating a surrounding situation around the host vehicle;
    a risk area estimation portion that estimates risk areas in each of which an object is likely to exist, and area risk degrees indicating risk degrees of the risk areas, based on the information obtained by the obtaining portion;
    a posture risk degree estimation portion that estimates posture risk degrees indicating risk degrees of respective postures, based on a relation between a positional relation between each of the risk areas and the host vehicle, and the postures of the object assumed to exist in the risk area;

an extraction portion that estimates an overall risk degree of each of the postures of the object assumed to exist in each of the risk areas, based on the corresponding area risk degree and the corresponding posture risk degree, selects the risk areas according to descending order of the overall risk degrees, and extracts windows from areas in the captured image, the areas respectively corresponding to the selected risk areas; and an identification portion that identifies whether each of the window images extracted by the extraction portion is an image showing the object, based on an identification model and the each of the window images, the identification model being selected from identification models generated in advance for the respective postures of the object to identify the object, in accordance with the posture of the object assumed to exist in the corresponding selected risk area, wherein each time when one of the risk areas is selected by the extraction portion, the extraction portion extracts the window image from the corresponding one of the areas in the captured image and the identification portion identifies whether the extracted window image is the image showing the object.

12. A non-transitory storage medium storing an object detection program that causes a computer to function as each of the portions constituting the object detection apparatus according to claim 1.

* * * * *